(12) United States Patent
Mao (10) Patent No.: US 9,473,039 B2
(45) Date of Patent: Oct. 18, 2016

(54) RECTIFYING MODULE, ELECTRICAL APPARATUS THEREOF, AND RECTIFYING METHOD THEREOF

(71) Applicant: NATIONAL TAIWAN UNIVERSITY, Taipei (TW)

(72) Inventor: Shau-Gang Mao, Taipei (TW)

(73) Assignee: NATIONAL TAIWAN UNIVERSITY, Taipei (TW)

( * ) Notice: Subject to any disclaimer, the term of this patent is extended or adjusted under 35 U.S.C. 154(b) by 347 days.

(21) Appl. No.: 14/221,329

(22) Filed: Mar. 21, 2014

(65) Prior Publication Data

US 2014/0286062 A1    Sep. 25, 2014

(30) Foreign Application Priority Data

Mar. 22, 2013   (TW) .............................. 102110234 A (51) Int. Cl.
*H02M 7/06*     (2006.01)
*H02M 7/00*     (2006.01)

(52) U.S. Cl.
CPC ................ *H02M 7/06* (2013.01); *H02M 7/003* (2013.01)

(58) Field of Classification Search
CPC .......... H02M 7/06; H02M 7/003; H02J 7/02; H02J 7/025
See application file for complete search history.

(56) References Cited

U.S. PATENT DOCUMENTS

| | | | | |
|---|---|---|---|---|
| 4,480,233 A * | 10/1984 | Juul | ....................... | H03B 9/143 331/107 P |
| 2013/0214611 A1* | 8/2013 | Bae | ......................... | H02M 7/06 307/104 |
| 2015/0077048 A1* | 3/2015 | Bae | ......................... | H02J 7/025 320/108 |
| 2015/0215007 A1* | 7/2015 | Goma | ..................... | H02J 17/00 320/108 |

\* cited by examiner

*Primary Examiner* — Matthew Nguyen
(74) *Attorney, Agent, or Firm* — Li & Cai Intellectual Property (USA) Office (57) ABSTRACT

An exemplary embodiment of the present disclosure illustrates a rectifying module, which is operable for rectifying an alternating current (AC) signal into a direct current (DC) signal. The rectifying module includes a transmission line, at least one rectifying unit, and at least one pattern. The transmission line is configured for receiving and transmitting the alternating current signal. The rectifying unit is arranged neighboring to the transmission line for operatively coupling with the transmission line to receive a part of the alternating current signal and rectifies the alternating current signal into the DC signal. The pattern is configured to be a hollow grounding structure and the pattern is disposed under the dual-line coupling areas of the rectifying unit neighboring to the transmission line.

15 Claims, 12 Drawing Sheets

RECTIFYING MODULE, ELECTRICAL APPARATUS THEREOF, AND RECTIFYING METHOD THEREOF

BACKGROUND

1. Technical Field

The present disclosure relates to a rectifying device, in particular, to a rectifying module, an electric apparatus thereof and a rectifying method thereof for charging using alternating current signal.

2. Description of Related Art

With the continuously growing popularity of battery-powered consumer electronic devices such as portable multimedia players, smart phones, and tablets, chargers with bundles of cables are commonly seen almost everywhere in one's household. Although, wired chargers are operable for providing stable signal, however the rectifying circuit thereof in general requires the use of diodes with high breakdown voltage and diodes with high breakdown voltage are costly. Moreover, there are disadvantages with using wired battery chargers such as creating wiring mess in the living space, placing distance limitation between the electronic device and the charger, cost consideration on the associated cable or wires, as well as creating inconvenience to the user. As a result, demand for wireless transmission gradually increases.

Moreover, following the rapid development of wireless technology, there is a growing trend toward the use of wireless charging. It is inevitable trend for the electronic device to adopt wireless power transmission to increase the flexibility, functionality and convenience of the electronic device as wireless power transmission technology can overcome the long-term issue of wired chargers having to charge devices through cables.

Exiting wireless charging technologies include capacitor coupling, microwave, electromagnetic coupling, electromagnetic induction, electromagnetic resonance, and the like, wherein electromagnetic induction and LC resonance circuit have been widely used in wireless power transmission. The main component for a wireless charging system using electromagnetic induction is the radio frequency (RF) rectifier, therefore the power conversion efficiency and input power of the RF rectifier has significant impacts on the chagrining efficiency of the wireless charging system using electromagnetic induction In addition, silicon-based Schottky diodes are general used as the rectifying component for either conventional wired chargers or wireless chargers. However, excessive RF input power could operatively cause resonance in a Schottky diode generated in response to the input current and input voltage, which might cause the junction between metal and semiconductor to breakdown which could damage the Schottky diode. Hence, the input power for the conventional rectifier is in practice configured to be lower than 30 dB. Additionally, the conversion efficiencies for conventional rectifiers are generally low.

In order for the rectifier to operate with higher input power, industries have come up with Gallium-nitride (GaN)-based Schottky diodes for increasing the breakdown voltage of the rectifier. In comparison to the silicon-based Schottky diodes having breakdown voltage of 15V, Gallium-nitride (GaN)-based Schottky diodes has higher breakdown voltage such as 90V. However, Gallium-nitride (GaN)-based Schottky diodes are costly, thus under cost consideration, Gallium-nitride (GaN)-based Schottky diodes are not suited for silicon-based semiconductor manufacturing processes.

SUMMARY

Accordingly, exemplary embodiments of the present disclosure provide a rectifying module for wireless charging, an electrical apparatus thereof, and a rectifying method thereof. In which, the rectifying module can use silicon-based Schottky diodes while being able to meet high input power and high power conversion efficiency demands, thereby lowers the associated cost.

An exemplary embodiment of the present disclosure provides a rectifying module, which is used for operatively rectifying an alternating current (AC) signal to a direct current (DC) signal. The rectifying module includes a transmission line, at least one rectifying unit, and at least one pattern. The transmission line is configured to operatively receive and transmit the AC signal. The rectifying unit is arranged neighboring to the transmission line and operatively coupling with the transmission line to receive a part of the AC signal therefrom. The rectifying unit further rectifies the AC signal received to the DC signal. The pattern is configured to be a hollow grounding structure. The pattern is disposed under at least a dual-line coupling area of the rectifying unit arranged neighboring to the transmission line.

An exemplary embodiment of the present disclosure provides a rectifying method, which is used for the aforementioned rectifying module. The rectifying method includes the following steps. The transmission line operatively receives and transmits an alternating current (AC) signal. At least one rectifying unit operatively receives a part of the AC signal from the transmission line via signal coupling and rectifies the AC signal received to a direct current (DC) signal.

An exemplary embodiment of the present disclosure provides an electrical apparatus. The electrical apparatus includes the aforementioned rectifying module and a load, wherein the load is coupled to the rectifying module. The load operatively receives the DC signal, wherein the DC signal is configured for powering the load To sum up, the rectifying module disclosed can be used in wireless charging for resolving the issues of the conventional electrical apparatus having to receive power through cable and wired charger having to charge the correspond mobile device through cable or wire, thereby increases the user's operating convenience. Moreover, the rectifying module are able to utilize silicon-based Schottky diodes as rectifying component while able to meet high input power and high power conversion efficiency demands, thereby has relatively lower cost.

In order to further understand the techniques, means and effects of the present disclosure, the following detailed descriptions and appended drawings are hereby referred, such that, through which, the purposes, features and aspects of the present disclosure can be thoroughly and concretely appreciated; however, the appended drawings are merely provided for reference and illustration, without any intention to be used for limiting the present disclosure.

BRIEF DESCRIPTION OF THE DRAWINGS

The accompanying drawings are included to provide a further understanding of the present disclosure, and are incorporated in and constitute a part of this specification. The drawings illustrate exemplary embodiments of the present disclosure and, together with the description, serve to explain the principles of the present disclosure.

DESCRIPTION OF THE EXEMPLARY EMBODIMENTS

Reference will now be made in detail to the exemplary embodiments of the present disclosure, examples of which are illustrated in the accompanying drawings. Wherever possible, the same reference numbers are used in the drawings and the description to refer to the same or like parts.

(An Exemplary Embodiment of a Rectifying Module)

Figure 1:
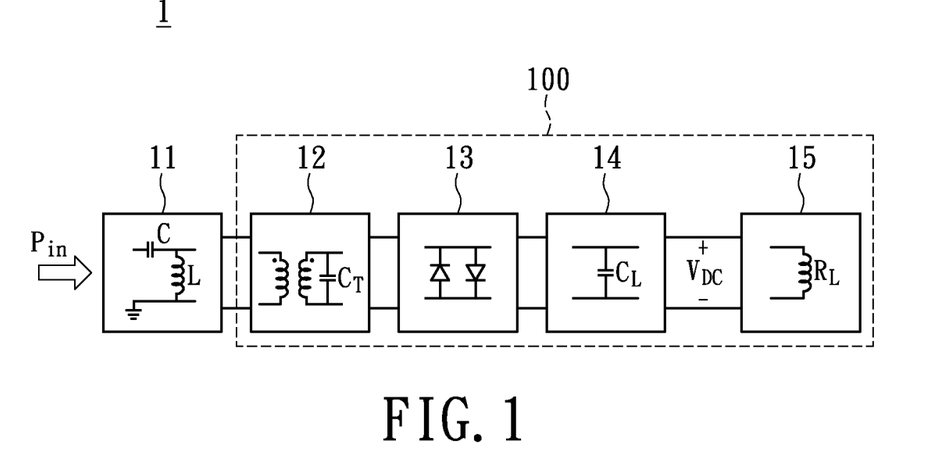
FIG. 1 is a diagram of a rectifying module provided in accordance to an exemplary embodiment of the present disclosure.

Please refer to FIG. 1, which shows a diagram illustrating a rectifying module provided in accordance to an exemplary embodiment of the present disclosure. As shown in FIG. 1, a rectifying module 1 of the instant embodiment includes an impedance matching circuit 11 and a rectifying unit 100. The rectifying unit 100 includes a power divider circuit 12, a rectifying circuit 13, a ripple capacitor 14, and a load 15. The power divider circuit 12 is coupled to the impedance matching circuit 11. The rectifying circuit 13 is coupled to the power divider circuit 12. The ripple capacitor 14 is coupled to the rectifying circuit 13. The load 15 is coupled to the ripple capacitor 14.

When a wireless transmitter (not shown) transmits an alternating current (AC) signal $P_{in}$ to the rectifying module 1, the impedance matching circuit 11 consisting of a capacitor C and an inductor L operatively receives the AC signal $P_{in}$. The impedance matching circuit 11 is configured to have low reflection coefficient for reducing the amount of signal distortion due to signal reflection. The AC signal $P_{in}$ may be a radio frequency (RF) signal or signal of other frequency band and the instant embodiment is not limited thereto. Additionally, the wireless transmitter in the instant embodiment is merely an illustration, in practice, the wireless transmitter can also be a wired transmitter, and the present disclosure is not limited thereto.

Next, the power divider circuit 12 is configured to divide an AC signal inputted into at least one signal having the same power or different power to the AC signal $P_{in}$ inputted. The power divider circuit 12 is formed from a plurality of conducting wires and at least a transmission line. The power divider circuit may further include a resonance capacitor $C_T$. The transmission line can be a microwave transmission line or a waveguide.

The rectifying circuit 13 is configured for receiving signals from the power divider circuit 12, rectifying signals received and generating the rectified signals. The rectifying circuit 13 has at least a diode. The diode can be implemented with a HSMS21102 chip, a HSMS2820 chip, a HSMS282 chip, or gallium nitride (GaN) diode, and the instant embodiment is not limited thereto. The ripple capacitor 14 is configured for operatively filtering the rectified signal and outputting a direct current (DC) signal $V_{DC}$ to the load 15.

More specifically, the rectifying circuit 13 has a plurality of rectifying units. Each of the rectifying units comprises of at least one diode. The power divider circuit 12 is configured for dividing the AC signal $P_{in}$ into multiple parts and each part of the AC signal is received by each respective rectifying unit. Each rectifying unit further rectifies the part of the AC signal received and outputs the corresponding DC signal. The DC signals outputted by the rectifying units are further combined at an output terminal of the rectifying circuit 13. The ripple capacitor 14 operatively filters the combined signal and generates the DC signal $V_{DC}$, which is supplied to the load 15.

It is worth to note that in order to increase the rectification and coupling efficiency of the power divider circuit 12, a plurality of hollow grounding structure patterns are respectively disposed underneath the power divider circuit 12. However, the exact shape of the patterns can be configured to be hollow triangular grounding structures, hollow quadrangular grounding structures, hollow polygon grounding structures, hollow circular grounding structures, hollow concentric grounding structures or combination thereof depend upon practical structure design and operational requirement of the rectifying module 1 and the instant embodiment is not limited to the example described herein.

(Another Exemplary Embodiment of a Rectifying Module)

Figure 2:
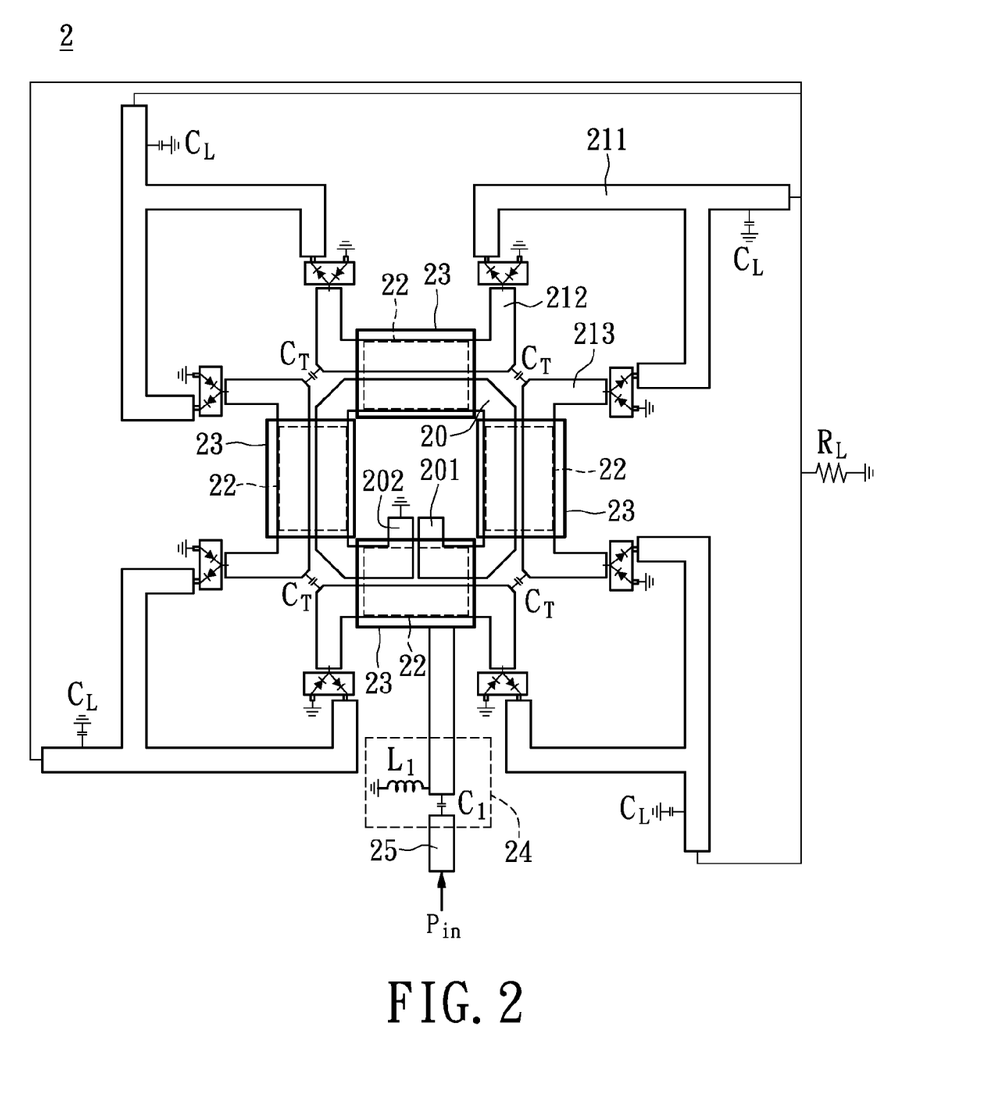
FIG. 2 is a circuit diagram of a rectifying module provided in accordance to another exemplary embodiment of the present disclosure.
Figure 2A:
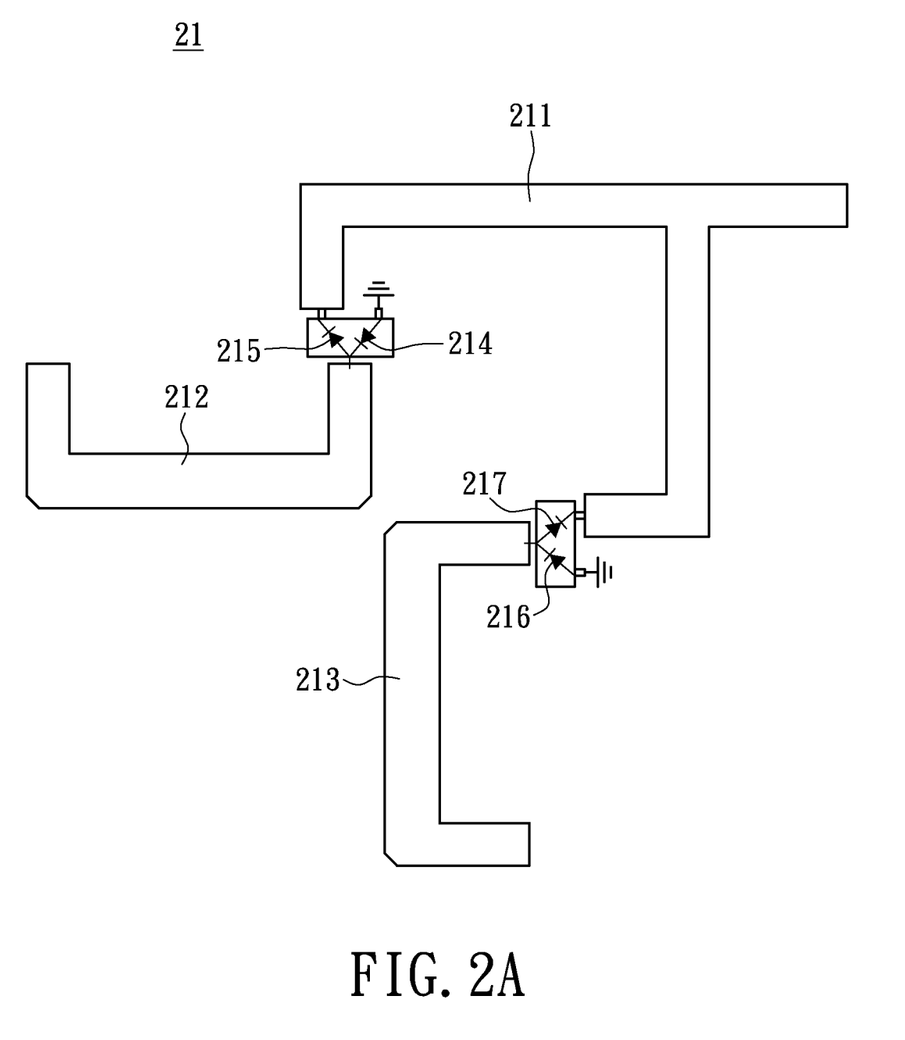
FIG. 2A is a circuit diagram of a rectifying unit of a rectifying module provided in accordance to the another exemplary embodiment of the present disclosure.

Please refer to FIG. 2 and FIG. 2A at same time. FIG. 2 shows a circuit diagram of a rectifying module provided in accordance to another exemplary embodiment of the present disclosure. FIG. 2A shows a circuit diagram of a rectifying unit of a rectifying module provided in accordance to the another exemplary embodiment of the present disclosure. The rectifying module 2 is formed on a substrate as shown in FIG. 2. The rectifying module 2 can be used for operatively rectifying an AC signal $P_{in}$ into a DC signal $V_{DC}$. The rectifying module 2 includes a transmission line 20, at least one rectifying unit 21, and at least one pattern 22, wherein the structure of the rectifying unit 21 is depicted in FIG. 2A. In the instant embodiment, the rectifying module 2 includes four rectifying units 21 and four patterns 22. The number of rectifying units 21 used can depend on the operational requirement of the rectifying module 2 such as the rectification and coupling efficiency, the number of patterns 22 disposed depends upon the number of the rectifying units 21 used.

The transmission line 20 has a first end 201 and a second end 202. The first end 201 is configured for receiving the AC signal $P_{in}$ and the second end 202 is coupled to a reference voltage. In one embodiment, the second end 202 is coupled to a ground for receiving a ground voltage as the reference voltage. In the instant embodiment, the transmission line 20 is a circular transmission line and the rectifying units 21 are placed or positioned on the outside of the circular transmission line. The AC signal $P_{in}$ is fed to the first end 201 of the circular transmission line and is transmitting toward the second end 202 along the circular transmission line for operatively transmitting a part of the AC signal to the at least one rectifying unit 21 placed on the same side along the circular transmission path. Therefore, the rectifying units 21 being arranged on the sane side can be considered as in series connection.

The rectifying units 21 are arranged neighboring to the transmission line 20. The rectifying units 21 operatively coupling with the transmission line to receive a part of the AC signal therefrom. Each of the rectifying units 21 further rectifies the AC signal received into the DC signal and operatively outputs to a load. The load in the instant embodiment is represented by a load resistor $R_L$, but the instant embodiment is not limited thereto.

Each of the patterns 22 is configured to be a hollow grounding structure. Each of the patterns 22 is disposed under at least a dual-line coupling area 23 of the respective rectifying unit 21 arranged neighboring to the transmission line 20, such as disposed under the substrate. In the instant embodiment, The patterns 22 are configured to be a hollow quadrangular grounding structure, however, in other implementations, the patterns 22 can be configured to be another hollow polygon grounding structures, hollow circular grounding structures, hollow concentric grounding structures, or the combination thereof for the purpose of increasing the rectification and coupling efficiency and the present disclosure is not limited to the example provided herein.

More specifically, please refer to FIG. 2A, which provides an illustration for one of the rectifying units 21. However, it shall be noted the FIG. 2A can serve as the implementation for other rectifying units 21 as well. Each of the rectifying units 21 is coupled to the load resistor $R_L$ as shown in FIG. 2. Each rectifying unit 21 includes a first through third conducting wires 211~213 and a first through fourth diodes 214~217. The first conducting wire 211 of each rectifying unit 21 is the third conducting wire of the respective neighboring rectifying unit 21. The first through third conducting wires 211~213 are bent conducting wires and are neighboring to the transmission line 20 forming the at least one dual-line coupling area 23. As shown FIG. 2, in the instant embodiment, there are four dual-line coupling areas 23. The dual-line coupling areas 23 can each form the power divider circuit described in the aforementioned embodiment.

A cathode of the first diode 214 and an anode of the second diode 215 are coupled to one end of the first conducting wire 211. An anode of the first diode 214 is operatively coupled to a reference voltage (e.g., a ground voltage). A cathode of the second diode 215 is coupled to one end of the second conducting wire 212. A cathode of the third diode 216 and an anode of the fourth diode 217 are coupled to one end of the third conducting wire 213. An anode of the third diode 216 is operatively coupled to the reference voltage (e.g., ground voltage). A cathode of the fourth diode 217 is coupled to the other end of the second conducting wire 212. Moreover, the first diode 214 and the second diode 215 can be implemented using the HSMS21102 chip. Similarly, the third diode 216 and the fourth diode 217 can also be implemented using the HSMS21102 chip. However, the present disclosure is not limited thereto.

Please refer again to FIG. 2 and FIG. 2A, the rectifying module 2 further includes an impedance matching circuit 24, a resonance capacitor $C_T$, and a ripple capacitor $C_L$. The first end 201 of the transmission line 20 is coupled to a power providing terminal 25 to receive the AC signal P. The impedance matching circuit 24 in the instant embodiment is formed by a first capacitor $C_1$ and a first inductor $L_1$. The impedance matching circuit 24 can prevent the AC signal $P_{in}$ from reflecting back to the power providing terminal 25 and reduce the amount of signal distortion caused by the signal reflection. One end of the ripple capacitor $C_L$ is coupled to one end of the second conducting wire 212 and the other end of the ripple capacitor $C_L$ is coupled to the ground. The ripple capacitor $C_L$ is used for stabilizing the DC signal and reducing the ripples in the DC signal. The resonance capacitor $C_T$ is coupled between the neighboring first and second conducting wires 211 and 212. The resonance capacitor $C_T$ is used for operatively eliminating the stray inductor generated in coupling operation and matching the impedance.

Figure 3:
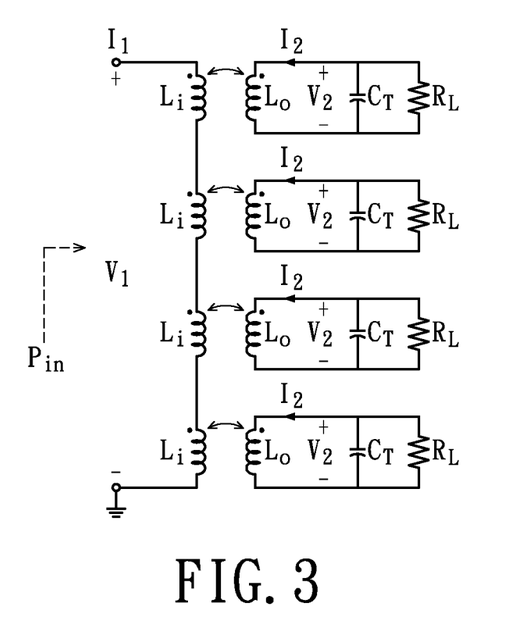
FIG. 3 is a circuit diagram illustrating an equivalent circuit of the rectifying module of FIG. 2 provided in accordance to another exemplary embodiment of the present disclosure.

Please to FIG. 3 in conjunction with FIG. 2 and FIG. 2A, wherein FIG. 3 shows a circuit diagram illustrating an equivalent circuit of the rectifying module of FIG. 2 provided in accordance to another exemplary embodiment of the present disclosure. From FIG. 3, it can be clearly noted that the AC signal $P_{in}$ received passes through four series-connected inductors $L_i$. Additionally, the four parts of the transmission line 20 is models as the inductor $L_i$ of FIG. 3. The first conducting wires 211 or the third conducting wires of the four dual-line coupling areas 23, at least one of the diodes 214~217, and the ripple capacitors $C_L$ together can be modeled by four inductors $L_o$ as shown in FIG. 3. The voltage component and the current component of the AC signal $P_{in}$ are denoted by $V_1$ and $I_1$, respectively. The inductor $L_o$ can operatively sense and generate voltage $V_2$ and current $I_2$ via coupling with the inductor Li.

(Another Exemplary Embodiment of a Rectifying Module)

Figure 4:
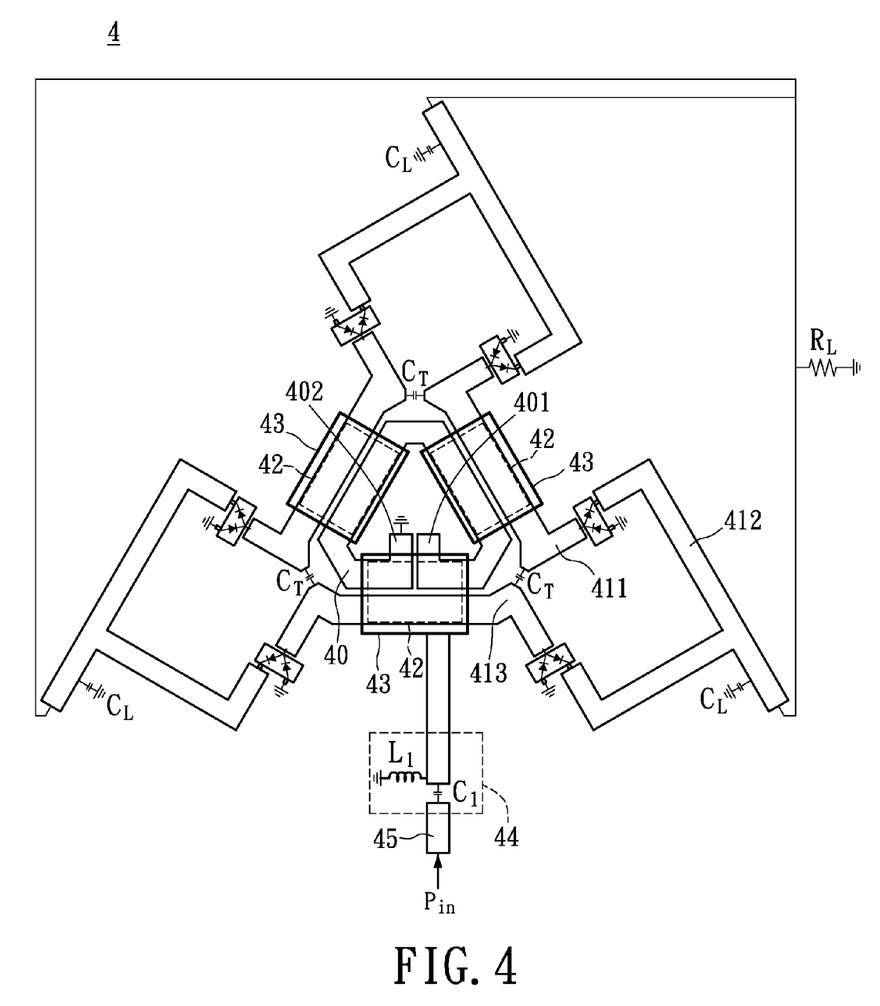
FIG. 4 is a circuit diagram of a rectifying module provided in accordance to further another exemplary embodiment of the present disclosure.
Figure 4A:
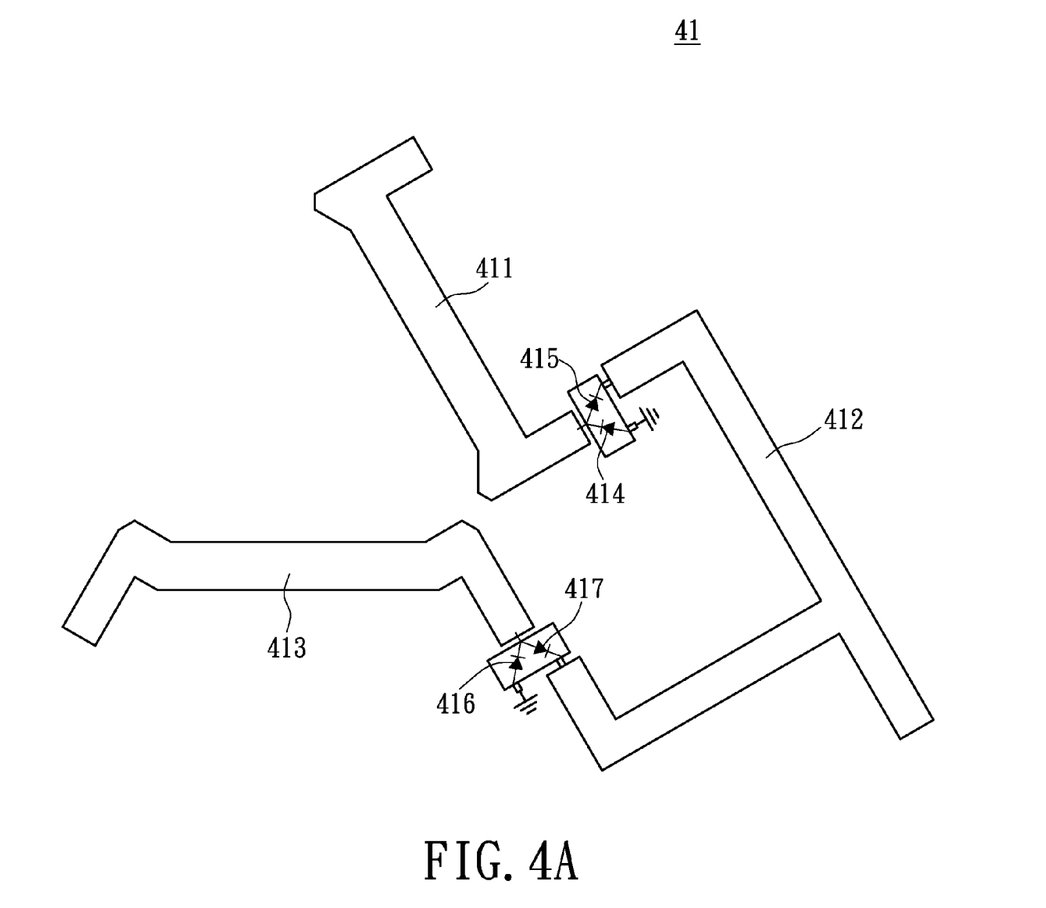
FIG. 4A is a circuit diagram of a rectifying unit of a rectifying module provided in accordance to the further another exemplary embodiment of the present disclosure.

Please refer FIG. 4 and FIG. 4A at same time. FIG. 4 shows a circuit diagram of a rectifying module provided in accordance to further another exemplary embodiment of the present disclosure. FIG. 4A shows a circuit diagram of a rectifying unit of a rectifying module provided in accordance to the further another exemplary embodiment of the present disclosure.

In comparison to the rectifying module 2 of FIG. 2 and FIG. 2A which has four rectifying units 21 and four patterns 22, the rectifying module 4 depicted in FIG. 4 and FIG. 4A has three rectifying units 41 and there patterns 42. The three patterns 42 are respectively disposed under the three dual-line coupling areas 43 of the rectifying units 41 neighboring to the transmission line 41. In short, the difference between the rectifying module 4 and the rectifying module 2 of FIG. 3 is in the number of the rectifying units 41 disposed. It shall be noted that the present disclosure does not limit the number of the rectifying units 41 used.

Moreover, those skilled in the art shall be able to infer the operation the coupling connection, and the structure associated with the transmission line 40 having a first end 401 and a second end 402, the rectifying units 41 comprising of a first through third conducting wires 411~413 and a first through fourth diodes 414~417, the patterns 42, the dual-line coupling areas 43, a impedance matching circuit 44 comprising of a first capacitor $C_1$, and a second capacitor $L_1$, a power provider terminal 45, a resonance capacitor $C_T$, a ripple capacitor $C_L$, and a load resistor $R_L$ from the aforementioned embodiment illustrated by FIG. 2 and FIG. 2A, hence further description are hereby omitted.

(Another Exemplary Embodiment of a Rectifying Module)

Figure 5:
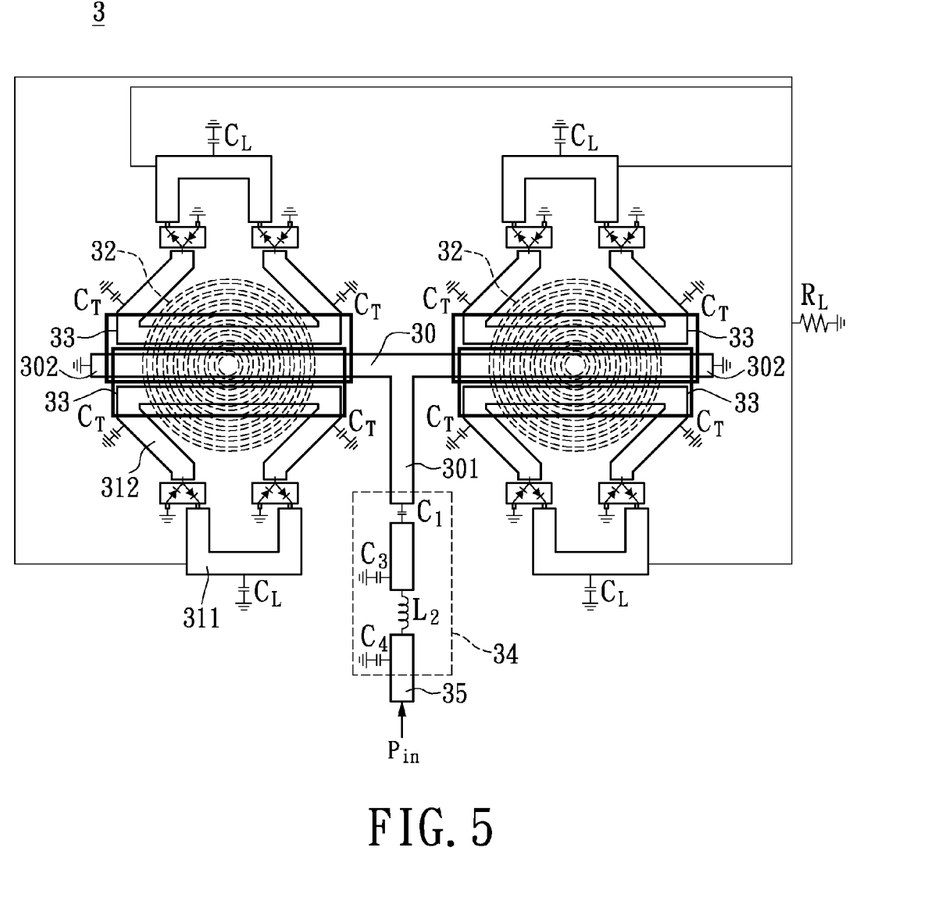
FIG. 5 is a circuit diagram of a rectifying module provided in accordance to further another exemplary embodiment of the present disclosure.
Figure 5A:
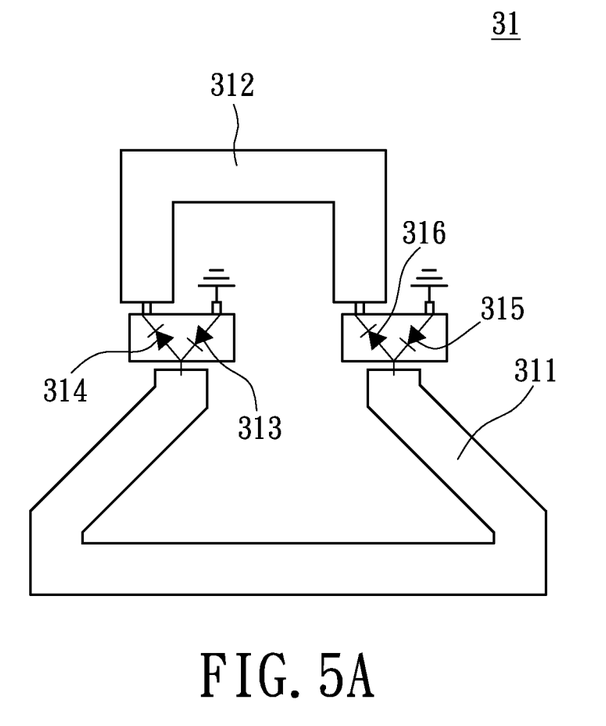
FIG. 5A is a circuit diagram of a rectifying unit of a rectifying module provided in accordance to the further another exemplary embodiment of the present disclosure.

Please refer to FIG. 5 and FIG. 5A at same time. FIG. 5 shows a circuit diagram of a rectifying module provided in accordance to further another exemplary embodiment of the present disclosure. FIG. 5A shows a circuit diagram of a rectifying unit of a rectifying module provided in accordance to the further another exemplary embodiment of the present disclosure. In the instant embodiment, the rectifying module 3 is formed on a substrate as shown in FIG. 2. The rectifying module 3 can be used for operatively rectifying an AC signal $P_{in}$ into a DC signal $V_{DC}$. The rectifying module 3 is configured to include a transmission line 30, at least one rectifying unit 31, and at least one pattern 32. In the instant embodiment, the rectifying module 3 includes the transmission line 30, four rectifying unit 31, and two patterns 32. It shall be noted that the number of rectifying units 31 used depends on the operational requirement of the rectifying module 3.

The transmission line 30 has a first end 301 and a second end 302. The first end 301 is configured for receiving the AC signal and the second end 302 is coupled to a reference voltage. In one embodiment, the second end 302 is coupled to a ground for receiving a ground voltage as the reference voltage. In the instant embodiment, the transmission line 30 is a T-shaped transmission line and the rectifying units 31 are respectively placed or positioned on two sides of a top member of the T-shaped transmission line. The AC signal $P_{in}$ is fed into the first end 301 and respectively transmits toward the two second ends 302 by the T-shaped transmission line for operatively transmitting a part of the AC signal $P_{in}$ to at least one rectifying unit 31 placed on different sides of the transmission path (e.g., on the two sides of the transmission path) along the transmission path. Therefore, the four rectifying units 31 can be considered as in parallel connection.

The rectifying units 31 are arranged neighboring to the transmission line 30 and operatively coupling with the transmission line to receive a part of the AC signal $P_{in}$ therefrom. Each of the rectifying units 21 further rectifies the AC signal $P_{in}$ received into the DC signal and operatively outputs to a load. The load in the instant embodiment is represented by a load resistor $R_L$, but the instant embodiment is not limited thereto.

The patterns 32 are configured to be a hollow grounding structure. Each of the patterns 32 is disposed under the dual-line coupling area 33 of the respective rectifying unit 31 neighboring to the transmission line 30, such as disposed under the substrate. In the instant embodiment, the patterns 32 are configured to be a hollow quadrangular grounding structure, however, in other implementation, the patterns 32 can be configured to be another hollow polygon grounding structures, hollow circular grounding structures, hollow concentric grounding structures, or the combination thereof for the purpose of increasing the rectification and coupling efficiency and the present disclosure is not limited to the example provided herein. Moreover, the transmission line 30 of the instant embodiment can be a microwave transmission line or a waveguide.

More specifically, please refer to FIG. 5A, which provides an illustration for one of the rectifying units 31. However, it shall be noted the FIG. 5A can serve as the implementation for the other rectifying unit 31 as well. Each rectifying unit 31 is coupled to the load resistor $R_L$ as shown in FIG. 5. Each rectifying unit 31 includes a first conducting wires 311, a second conducting wires 312, and a first through fourth diodes 313~316. The first conducting wire 311 and the second conducting wire 312 are bent conducting wires and are neighboring to the transmission line 30 forming the dual-line coupling areas 33 as shown FIG. 5. The dual-line coupling areas 33 can each form the power divider circuit described in the aforementioned embodiment.

A cathode of the first diode 313 and an anode of the second diode 314 are coupled to one end of the first conducting wire 311. An anode of the first diode is operatively coupled to a reference voltage (e.g., a ground voltage). A cathode of the second diode is coupled to one end of the second conducting wire 312. A cathode of the third diode 315 and an anode of the fourth diode 316 are coupled to the other end of the first conducting wire 311. An anode of the third diode operatively coupled to the reference voltage (e.g., a ground voltage). A cathode of the fourth diode is coupled to the other end of the second conducting wire 312. Moreover, the first diode 313 and the second diode 314 can be implemented using the HSMS21102 chip. Similarly, the third diode 315 and the fourth diode 316 can also be implemented using the HSMS21102 chip. However, the present disclosure is not limited thereto.

Please refer again to FIG. 5 and FIG. 5A, the rectifying module 3 can further include an impedance matching circuit 34, a resonance capacitor $C_T$, and a ripple capacitor $C_L$. The first end 301 of the transmission line 30 is coupled to a power providing terminal 35 to receive the AC signal P. The impedance matching circuit 34 comprises of a first capacitor $C_1$ and a first inductor $L_1$. The impedance matching circuit 34 can prevent the AC signal $P_{in}$ from reflecting back to the power providing terminal 35 and reduce an amount of signal distortion caused by the signal reflection. One end of the ripple capacitor $C_L$ is coupled to one end of the second conducting wire 312 and the other end of the ripple capacitor $C_L$ is coupled to the ground. The ripple capacitor $C_L$ is used for stabilizing the DC signal and reducing the ripples in the DC signal. The resonance capacitor $C_T$ is coupled between the neighboring first and second conducting wires 311 and 312. The resonance capacitor $C_T$ is used for operatively eliminating the stray inductor generated in coupling operation and matching the impedance.

Figure 6:
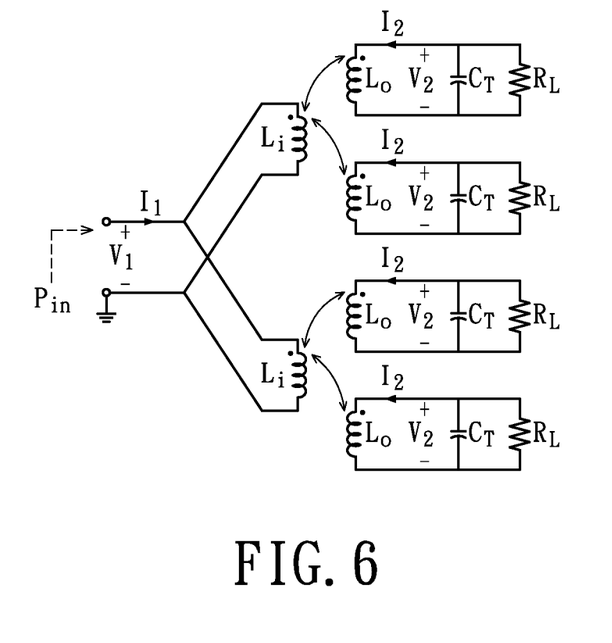
FIG. 6 is a circuit diagram illustrating an equivalent circuit of the rectifying module of FIG. 5 provided in accordance to another exemplary embodiment of the present disclosure.

Please to FIG. 6 in conjunction with FIG. 5 and FIG. 5A, wherein FIG. 6 shows a circuit diagram illustrating an equivalent circuit of the rectifying module of FIG. 5 provided in accordance to another exemplary embodiment of the present disclosure. It can be clearly noted from FIG. 6, the AC signal $P_{in}$ received from the first end 301 is transmitted toward the two second ends 302, which is equivalent to two parallel-connected inductors $L_i$ receiving the AC signal $P_{in}$. Moreover, two sides of the top member can be models as the inductor $L_i$ of FIG. 6. The second conducting wires 312 of the two dual-line coupling areas 33, at least one of the diodes 313~316 and the ripple capacitors $C_L$ together can be modeled by four inductors $L_o$ of FIG. 6. Since the two rectifying units are positioned on the two sides of the transmission line 30, respectively, therefore one inductor $L_i$ corresponds to two parallel-connected inductors $L_o$. The voltage component and the current component of the AC signal $P_{in}$ are denoted by $V_1$ and $I_1$, respectively. The inductor Lo can operatively sense and generate voltage $V_2$ and current $I_2$ via coupling with the inductor Li.

(Another Exemplary Embodiment of a Rectifying Module)

Figure 7:
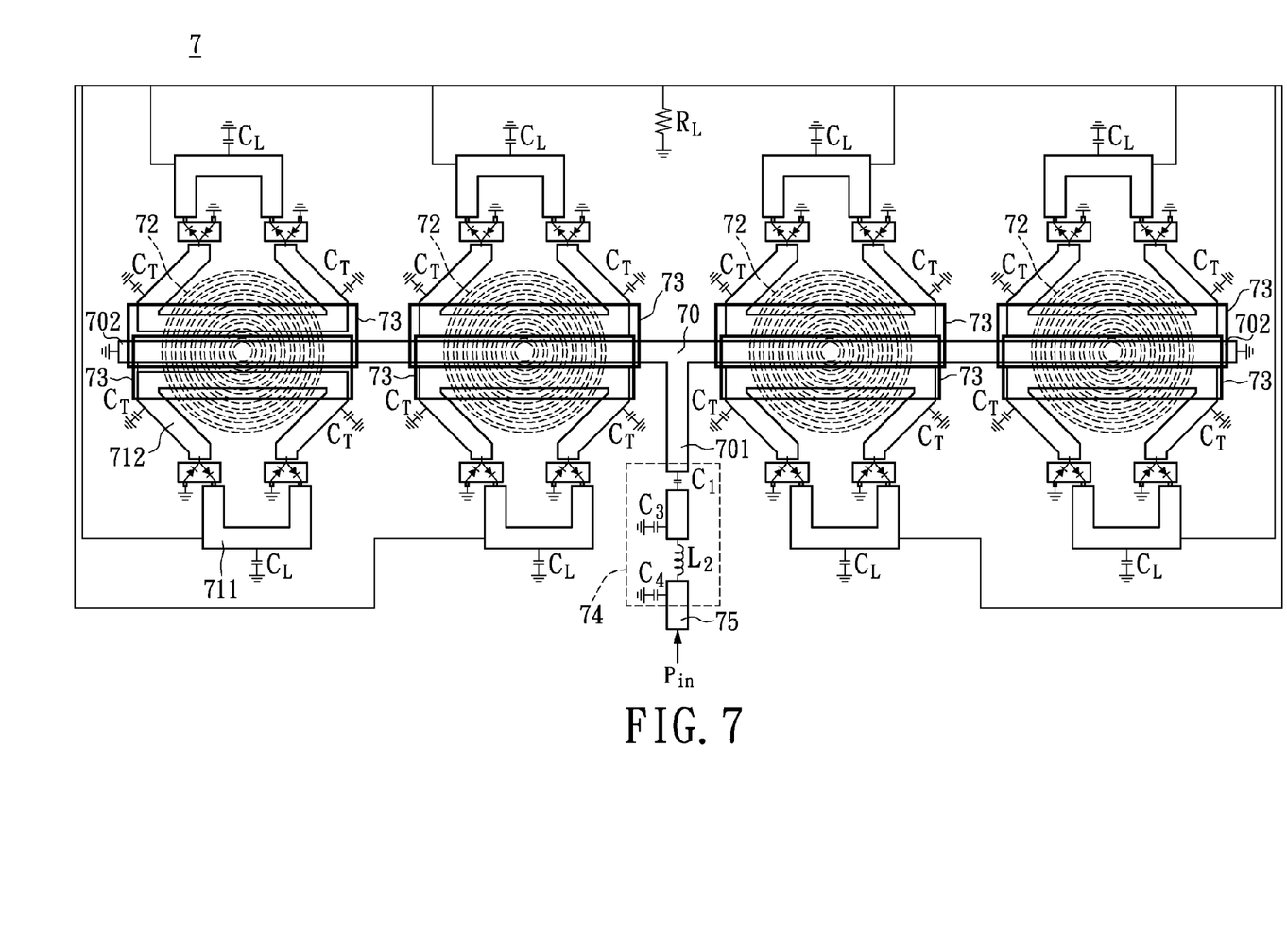
FIG. 7 is a circuit diagram of a rectifying module provided in accordance to further another exemplary embodiment of the present disclosure.
Figure 7A:
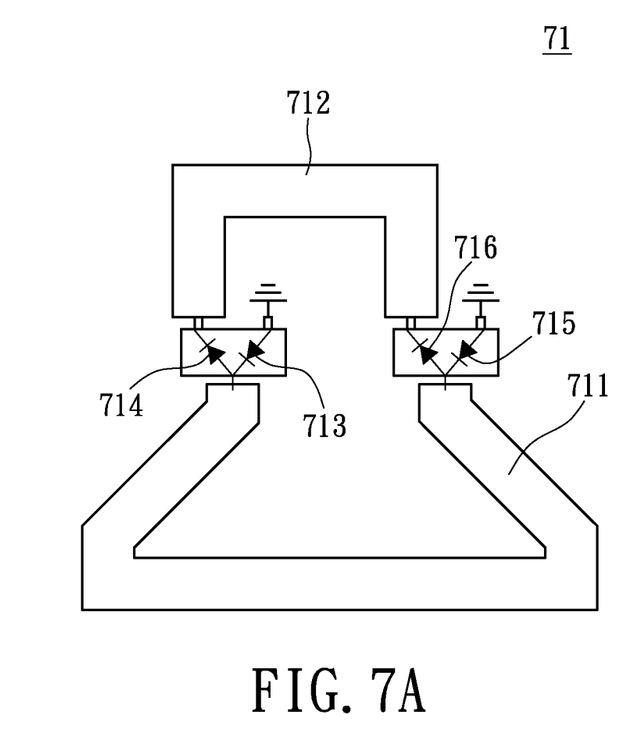
FIG. 7A is a circuit diagram of a rectifying unit of a rectifying module provided in accordance to the further another exemplary embodiment of the present disclosure.

Please refer FIG. 7 and FIG. 7A at same time. FIG. 7 shows a circuit diagram of a rectifying module provided in accordance to further another exemplary embodiment of the present disclosure. FIG. 7A shows a circuit diagram of a rectifying unit of a rectifying module provided in accordance to the further another exemplary embodiment of the present disclosure. In comparison to the rectifying module 3 depicted in FIG.5 and FIG. 5A which has four rectifying units 21 and two patterns 32, the rectifying module 7 depicted in FIG. 7 and FIG. 7A has eight rectifying units 41 and four patterns 42. The four patterns 42 are respectively disposed under the eight dual-line coupling areas 73 of the eight rectifying units 42 arranged neighboring to the transmission line 70. The two rectifying units positioned on the same side can be considered as in series connection. In short, the difference between the rectifying module 7 and the rectifying module 3 of FIG. 5 is in the number of the rectifying units 71. It shall be noted that the present disclosure does not limit the number of the rectifying units 71 used.

Moreover, those skilled in the art shall be able to infer the operation the coupling connection, and the structure associated with the transmission line 70 having a first end 701 and a second end 702, the rectifying units 71 comprising of the first and second conducting wires 711, 712, a first through fourth diodes 713~716, the patterns 72, the dual-line coupling areas 73, a impedance matching circuit 71 comprising of a first capacitor $C_1$ and a second capacitor $L_1$, a power provider terminal 75, a resonance capacitor $C_T$, a ripple capacitor $C_L$, and a load resistor $R_L$ from the aforementioned embodiment illustrated by FIG. 5 and FIG. 5A, hence further description are hereby omitted.

(An Exemplary Embodiment of an Electrical Apparatus)

Figure 8:
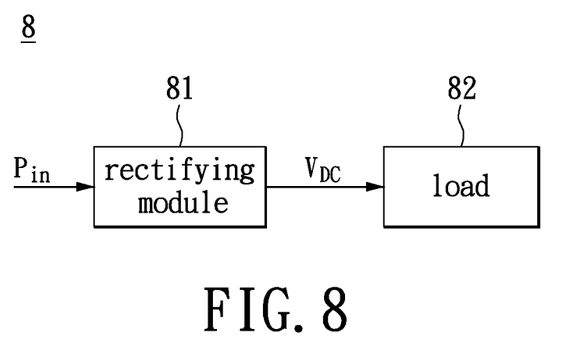
FIG. 8 is a diagram of an electrical apparatus provided in accordance to an exemplary embodiment of the present disclosure.

Please refer to FIG. 8, which shows a diagram of an electrical apparatus provided in accordance to an exemplary embodiment of the present disclosure. An electrical apparatus 8 includes a load 82 and a rectifying module 81 connected to the load 82. The rectifying module 81 can be implemented by any one of the rectifying modules described in the aforementioned embodiment or a rectifying module (e.g., the rectifying module 10 of FIG. 1) modified based on the concept or idea taught in the aforementioned embodiment. The rectifying module 81 is used for operatively rectifying an AC signal $P_{in}$ and outputting the DC signal $V_{DC}$ to the load 82. The load 82 operatively receives the DC signal $V_{DC}$ and operates. The load 82 can be all kinds of chip module, circuit, or battery module, such as cell phone chip module, tablet chip module, or battery module for electrical car.

It is worth to note that, if the load 82 is the battery module for an electrical car and the rectifying module 81 is installed on the chassis of the electrical car, then the road can have the RF transmitter correspondingly disposed. Such that when the power of the battery module of the electrical car is insufficient to support the operation of the electrical car, the driver can drive the electrical car into the road having the RF transmitter installed for the RF transmitter to operatively charge the battery module of the electrical car.

(An Exemplary Embodiment of a Rectifying Method)

Figure 9:
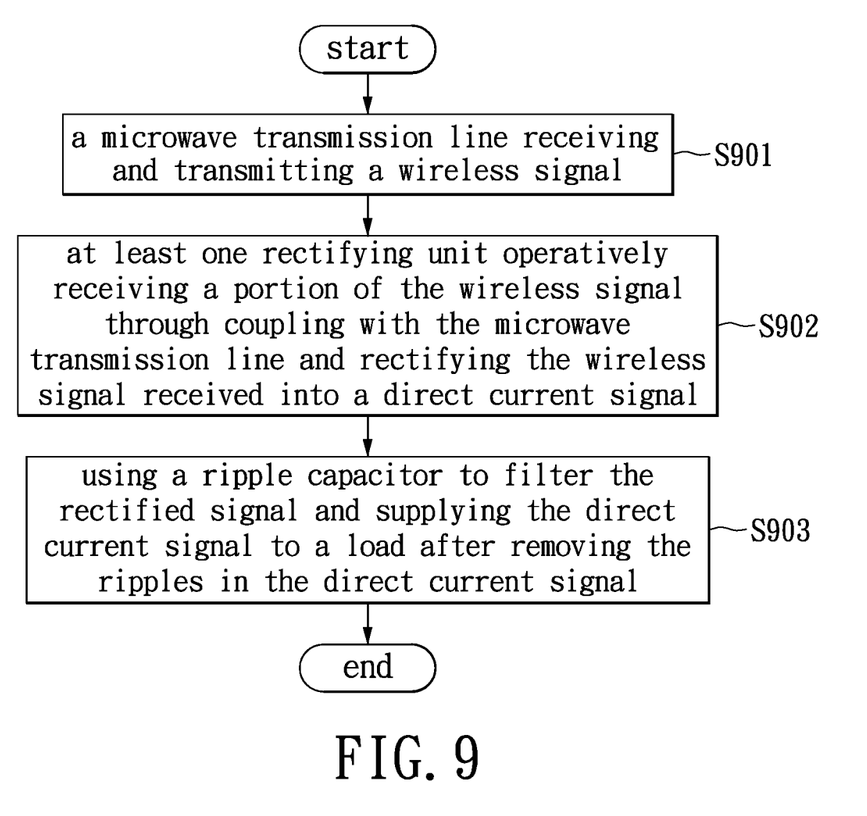
FIG. 9 is a flowchart diagram illustrating a rectifying method for a rectifying module provided in accordance to an exemplary embodiment of the present disclosure.

Please refer to FIG. 9, which shows a flowchart diagram illustrating a rectifying method for a rectifying module provided in accordance to an exemplary embodiment of the present disclosure. The rectifying method of the instant embodiment can be used for the aforementioned rectifying module or a rectifying module modified according to the aforementioned embodiment. In Step S901, a transmission line (e.g., a microwave transmission line) is driven to receive and transmit a wireless signal (e.g., the AC signal). In Step S902, at least one rectifying unit operatively receives a part of the wireless signal through coupling with the transmission line and rectifies the wireless signal received into a DC signal. In Step S903, a ripple capacitor operatively filters the rectified signal and supplying the DC signal to a load after removing the ripples in the DC signal.

According to the exemplary embodiments, the rectifying module, the electrical apparatus thereof, and the rectifying method thereof are operable to evenly distribute a high power AC signal to at least a rectifying unit through a power dividing method, thereby resolve the issue of the silicon-based Schottky diode having low breakdown voltage It is worth to note that in order to increase the coupling efficiency of the conventional reciter, hollow grounding structures are respectively disposed under the dual-line coupling areas of the rectifying units to increase the input power and the coupling efficiency.

In summary, the rectifying module disclosed in the present disclosure further resolve the long term issues of the electronic device having to receive power through cable or wire as well as the inconvenience of the mobile device having to charge the rechargeable battery thereof. Therefore, the rectifying module can bring great operating convenience to the end-user, Moreover, the rectifying module are able to utilize silicon-based Schottky diodes as rectifying component while able to meet high input power and high power conversion efficiency demands, thereby has relatively lower cost The above-mentioned descriptions represent merely the exemplary embodiment of the present disclosure, without any intention to limit the scope of the present disclosure thereto. Various equivalent changes, alternations or modifications based on the claims of present disclosure are all consequently viewed as being embraced by the scope of the present disclosure.

What is claimed is:

1. A rectifying module, operatively rectifying an alternating current (AC) signal to a direct current (DC) signal, the rectifying module comprising:

a transmission line, configured to operatively receive and transmit the AC signal;

a plurality of rectifying units, operatively rectifying the AC signal received to the DC signal, each of the rectifying unit being arranged neighboring to the transmission line and operatively coupling with the transmission line to receive a part of the AC signal therefrom, each rectifying unit is coupled to a load, and each rectifying unit comprises:

a first through third conducting wires, the first conducting wire of each rectifying unit is the third conducting wire of the respective neighboring rectifying unit;

a first through fourth diodes, a cathode of the first diode and an anode of the second diode being coupled to one end of the first conducting wire, an anode of the first diode being operatively coupled to a reference voltage, a cathode of the second diode being coupled to one end of the second conducting wire, a cathode of the third diode and an anode of the fourth diode being coupled to one end of the third conducting wire, an anode of the third diode operatively coupled to the reference voltage, and a cathode of the fourth diode being coupled to the other end of the second conducting wire; and a plurality of patterns, each pattern being configured to be a hollow grounding structure and each pattern being disposed under at least a dual-line coupling area of the rectifying unit arranged neighboring to the transmission line;

wherein the rectifying units are placed on the same side of the transmission line.

2. The rectifying module according to claim 1, further comprising:

an impedance matching circuit, one end of the transmission line electrically connected to a power providing terminal through the impedance matching circuit and at least another end of the transmission line operatively coupled to a reference voltage, for the transmission line to receive the AC signal.

3. The rectifying module according to claim 1, wherein the transmission line is a circular transmission line and the rectifying units are placed on the outside of the circular transmission line.

4. The rectifying module according to claim 1, comprising a plurality of the rectifying units and a plurality of patterns, wherein the rectifying units are arranged on different sides of the transmission line.

5. The rectifying module according to claim 4, wherein the transmission line is a T-shaped transmission line and the rectifying units are placed on two sides of a top member of the T-shaped transmission line.

6. The rectifying module according to claim 4, wherein each of the rectifying units comprises:

a first conducting wire;

a second conducting wire; and a first through fourth diodes, a cathode of the first diode and an anode of the second diode being coupled to one end of the first conducting wire, an anode of the first diode being operatively coupled to a reference voltage, a cathode of the second diode being coupled to one end of the second conducting wire, a cathode of the third diode and an anode of the fourth diode being coupled to the other end of the first conducting wire, an anode of the third diode operatively coupled to the reference voltage, and a cathode of the fourth diode being coupled to the other end of the second conducting wire.

7. The rectifying module according to claim 1, wherein the pattern is one of a hollow polygon grounding structure, a hollow circular grounding structure, and a hollow concentric grounding structure.

8. A rectifying method, used for a rectifying module, the rectifying module comprising of a transmission line, a plurality of rectifying units, and a plurality of patterns, each rectifying unit being arranged neighboring to the transmission line, each pattern being a hollow grounding structure and being disposed under at least a dual-line coupling area of the respective rectifying unit neighboring to the transmission line, the rectifying method comprising:

the transmission line operatively receiving and transmitting an alternating current (AC) signal; and the rectifying units receiving a part of the AC signal from the transmission line via signal coupling and rectifying the AC signal received to a direct current (DC) signal;

wherein the rectifying units are placed on the same side of the transmission line, each rectifying unit is coupled to a load, and each rectifying unit comprises:

a first through third conducting wires, the first conducting wire of each rectifying unit is the third conducting wire of the respective neighboring rectifying unit; and a first through fourth diodes, a cathode of the first diode and an anode of the second diode being coupled to one end of the first conducting wire, an anode of the first diode being operatively coupled to a reference voltage, a cathode of the second diode being coupled to one end of the second conducting wire, a cathode of the third diode and an anode of the fourth diode being coupled to one end of the third conducting wire, an anode of the third diode operatively coupled to the reference voltage, and a cathode of the fourth diode being coupled to the other end of the second conducting wire.

9. An electrical apparatus, comprising:

a rectifying module, operatively rectifying an alternating current (AC) signal to a direct current (DC) signal, the rectifying module comprising:

a transmission line, configured to operatively receive and transmit the AC signal;

a plurality of rectifying units, operatively rectifying the AC signal received to the DC signal, each rectifying unit being arranged neighboring to the transmission line and the rectifying unit operatively coupling with the transmission line to receive a part of the AC signal therefrom, each rectifying unit is coupled to a load, and each rectifying unit comprises:

a first through third conducting wires, the first conducting wire of each rectifying unit is the third conducting wire of the respective neighboring rectifying unit ;

a first through fourth diodes, a cathode of the first diode and an anode of the second diode being coupled to one end of the first conducting wire, an anode of the first diode being operatively coupled to a reference voltage, a cathode of the second diode being coupled to one end of the second conducting wire, a cathode of the third diode and an anode of the fourth diode being coupled to one end of the third conducting wire, an anode of the third diode operatively coupled to the reference voltage, and a cathode of the fourth diode being coupled to the other end of the second conducting wire;

a plurality of patterns, each pattern being configured to be a hollow grounding structure and each pattern being disposed under at least a dual-line coupling area of the rectifying unit arranged neighboring to the transmission line; and a load, operatively receiving the DC signal, wherein the DC signal is configured for powering the load;

wherein the rectifying units are placed on the same side of the transmission line.

10. The electrical apparatus according to claim 9, wherein the rectifying module comprises:

an impedance matching circuit, one end of the transmission line electrically connected to a power providing terminal through the impedance matching circuit and at least another end of the transmission line operatively coupled to a reference voltage, for the transmission line to receive the AC signal.

11. The electrical apparatus according to claim 9, wherein the transmission line is a circular transmission line and the rectifying units are placed on the outside of the circular transmission line.

12. The electrical apparatus according to claim 9, wherein the rectifying module comprises a plurality of the rectifying units and a plurality of patterns, and the rectifying units are arranged on different sides of the transmission line.

13. The electrical apparatus according to claim 12, wherein the transmission line is a T-shaped transmission line and the rectifying units are placed on two sides of a top member of the T-shaped transmission line.

14. The electrical apparatus according to claim 12, wherein each of the rectifying units comprises:
- a first conducting wire;
- a second conducting wire; and
- a first through fourth diodes, a cathode of the first diode and an anode of the second diode being coupled to one end of the first conducting wire, an anode of the first diode being operatively coupled to a reference voltage, a cathode of the second diode being coupled to one end of the second conducting wire, a cathode of the third diode and an anode of the fourth diode being coupled to the other end of the first conducting wire, an anode of the third diode operatively coupled to the reference voltage, and a cathode of the fourth diode being coupled to the other end of the second conducting wire.

15. The electrical apparatus according to claim 9, wherein the pattern is one of a hollow polygon grounding structure, a hollow circular grounding structure, and a hollow concentric grounding structure.

* * * * *